Patented May 25, 1926.

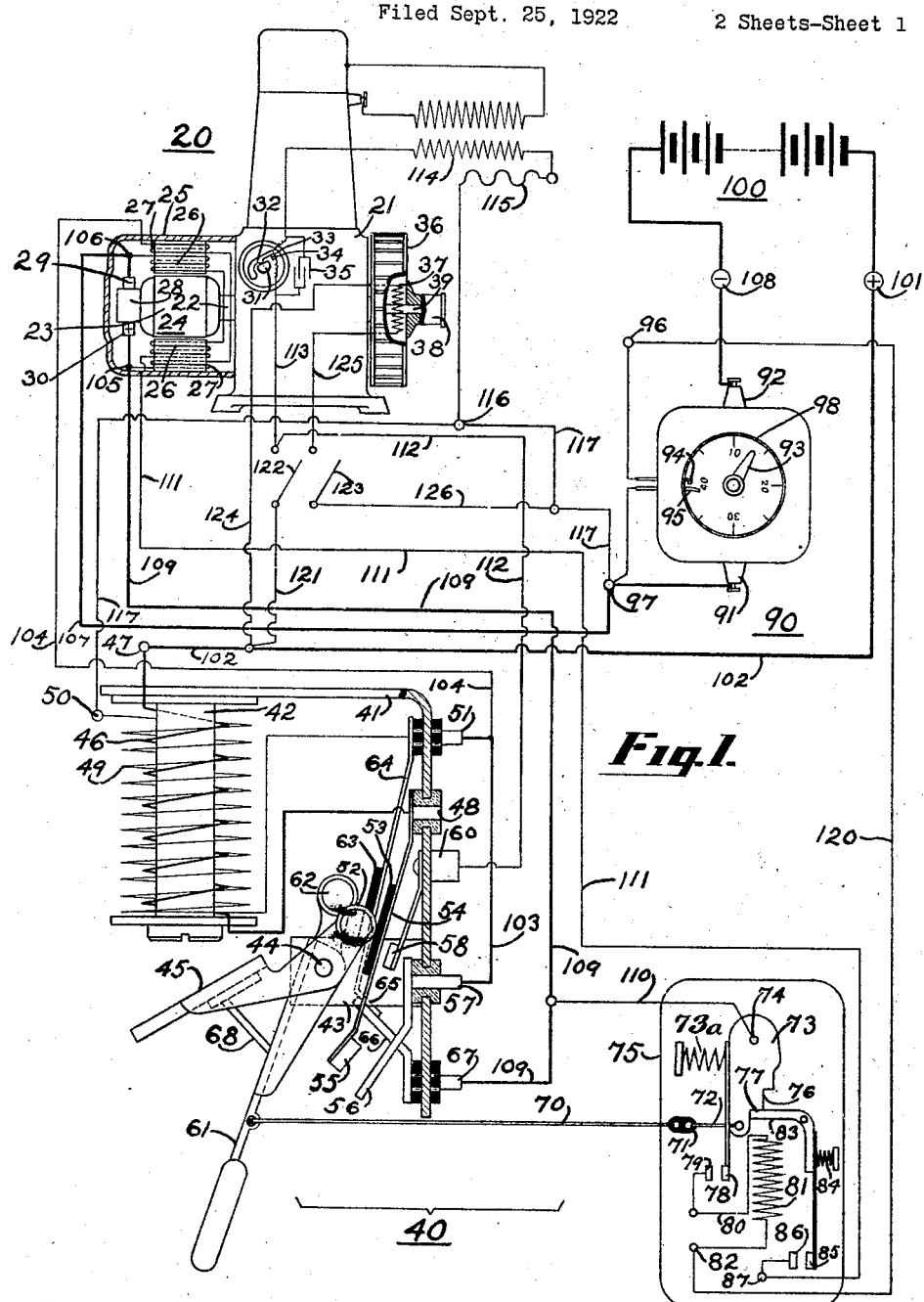

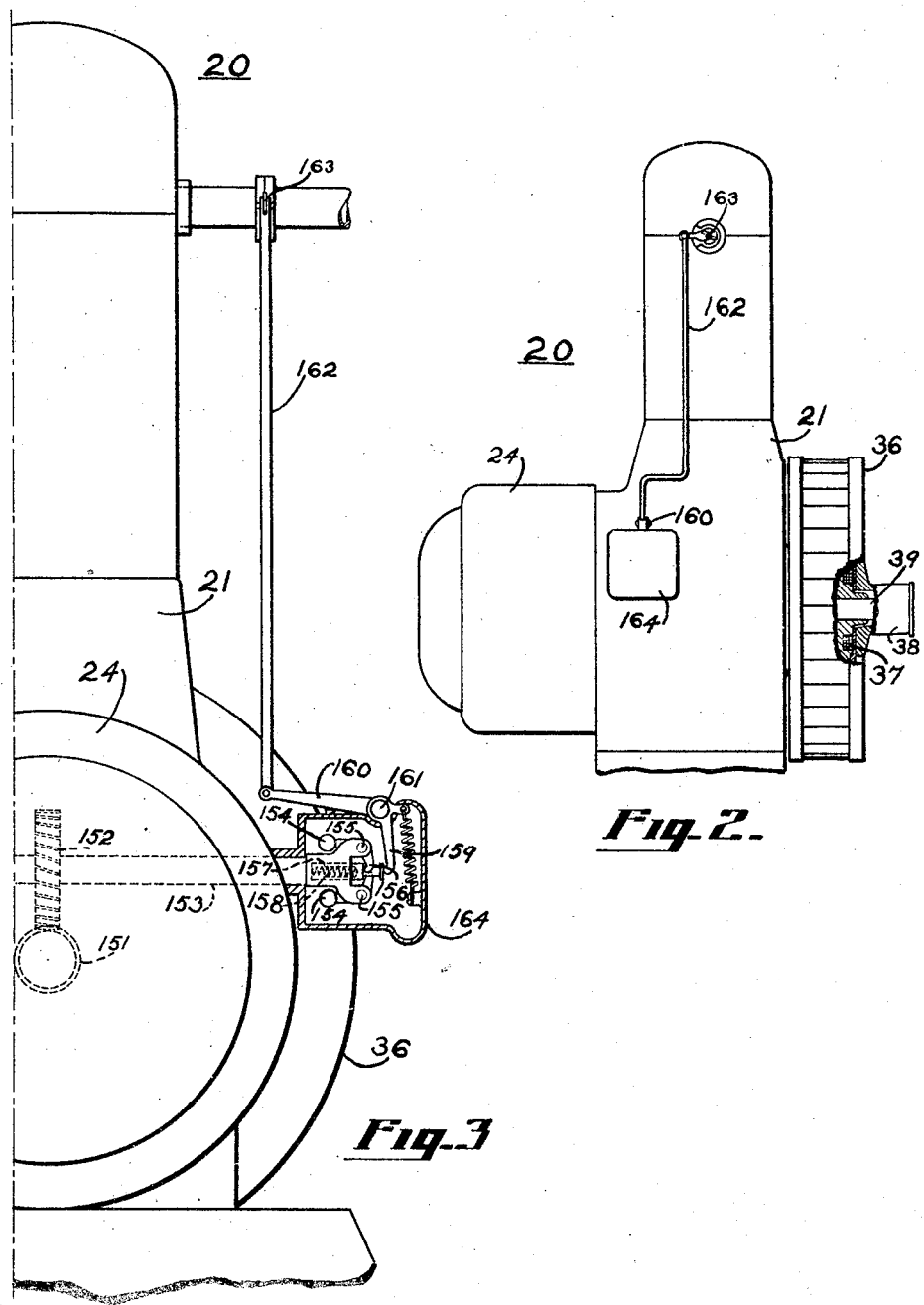

1,586,034

UNITED STATES PATENT OFFICE.

JOSEPH C. FEDERLE, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed September 25, 1922. Serial No. 590,216.

This invention relates to power plants wherein an internal-combustion engine drives a dynamo as a generator for charging a storage battery, the dynamo being in turn adapted to operate as a motor on battery current for cranking the engine.

In battery charging systems of this kind means have been provided for automatically discontinuing the battery charging after the battery has reached a predetermined state of charge, and this discontinuing of the battery charging has been accomplished by stopping the engine by cutting off ignition or the fuel supply. In order to prevent discharge of the battery through the dynamo, means are provided for disconnecting the battery in case the engine stops.

One of the main objects of the present invention is to provide a power plant and battery charging system wherein the battery charging operation will be discontinued after the battery has reached a certain charge, but, if desired, the system may be so controlled that the engine may keep on running after the battery has been disconnected from the generator.

In this connection it is a further object to render the generator inoperative automatically when the battery has reached a certain charge so that the engine may continue to operate to drive some other machinery without carrying the load of the generator.

A further object of the invention is to provide, in a system of the kind referred to, means for controlling a magnetic flywheel clutch adapted to receive current from the storage battery whereby the engine may be connected or disconnected to some piece of mechanism as for example, a pulley which is belted to some machinery and the engine to be driven.

Further objects and advantages of the present invention will be apparent from the following description, reference being had to the accompanying drawings, wherein a preferred embodiment of one form of the present invention is clearly shown.

In the drawings:

Fig. 1 is a wiring diagram and a diagrammatic side view of an internal-combustion engine and dynamo embodying the present invention;

Fig. 2 is a side elevation partly in section of a power plant showing a flywheel clutch;

Fig. 3 is a fragmentary end view partly in section of the power plant shown in Fig. 2 showing the governor for controlling the engine throttle valve.

Referring to the drawings, 20 designates the power plant including an engine 21 which drives through the engine shaft 22 the armature 23 of a dynamo 24. The field frame 25 of dynamo 24 is carried by the engine and supports shunt field windings 26 and series field windings 27. The windings of armature 23 are connected with commutator 28, and brushes 29 and 30 bear against the commutator 28. The engine drives an ignition timer cam 31 which cooperates with a breaker lever 32 carrying a contact 33 which cooperates with a stationary contact 34. A condenser 35 is shunted around the contacts 33 and 34.

A flywheel 36 is driven by the engine shaft 22 and carries a magnet winding 37 which cooperates with the magnetizable material of the flywheel 36 to provide an electro-magnet adapted to cooperate with a magnetizable pulley member mounted loosely upon an extension 39 of the shaft 22. The exact nature of the magnetic clutch does not of itself constitute a part of the present invention but is described and claimed in the copending application of Charles F. Kettering, Serial No. 590,253, filed September 25, 1922.

40 designates a controller including a frame 41 supporting a magnet core 42 and a post 43 upon which is pivotally mounted at 44 an armature 45, the parts 41 to 45 inclusive being constructed of magnetizable material. The core 42 supports a relatively coarse series winding 46 having terminals at 47 and 48, and a relatively fine shunt or voltage winding 49 having terminals at 50 and 51. The armature 45 carries a roller 52 which engages a nonconducting block 53 carried by a flexible contact blade 54. Blade 54 carries contact 55 which will engage stationary contact 56 attached to terminal 57. Blade 54 also is adapted to engage a contact 58 carried by switch blade 59 having a terminal 60. A starting switch lever 61 is pivoted at 44 and carries a roller 62 for engaging a nonconducting block 63 carried by the switch blade 64 having its end 65 adapted normally to engage a switch contact 66 having a terminal 67. The lever 61 carries an extension 68 adapted to engage the armature 45.

Lever 61 is connected by link members 70, 71, and 72 with a detent plate or latch 73 which is pivoted at 74 on a supporting bracket 75. A spring 73ª normally tends to hold the latch 73 in the position shown. Latch 73 is provided with notches 76 and 77 and carries a contact 78 arranged to engage a contact 79, said contact 79 being connected by wire 80 with an electro-magnet winding 81 which in turn is connected with a terminal 82. The magnet winding 81 operates when energized sufficiently to attract an armature 83 against the action of a spring 84. Armature 83 carries a contact 85 for engaging a contact 86 connected with a terminal 87.

90 designates a device for controlling the controller 40 in such a way as to disconnect the generator from the battery after the battery has received a certain amount of charge. This device 90 is preferably an ampere hour meter having preferably main terminals 91 and 92 in the battery charging circuit and hand or pointer 93 for indicating the state of charge on a dial 98. During the operation of the meter 90 the hand 93 will effect the closing of contacts 94 and 95 which are connected with terminals 96 and 97 respectively.

The operation of the power plant is as follows:

The starting lever 61 is pulled up so as to move the armature 45 toward the core 42 so that the armature may be held in attracted position when the core is energized. This operation will cause the blade 54 and the contact 55 to be moved respectively into engagement with the contact 58 and the contact 56, and, at the same time the roller 62 will engage the block 63, and therefore the contacts 65 and 66 will be separated. When the lever 61 is being moved to this position, the latch 73 will be moved in a clockwise direction so as to bring the contacts 78 and 79 into engagement and to move the notch 77 away from the armature 83. Thereupon armature 83 is moved in a clockwise direction by the spring 84 until the armature 83 moves into the notch 76. At this time the contact 85 carried by the armature 83 will be moved into engagement with the contact 86. All these operations cause the following circuits to be established:

The engine cranking circuit is as follows:

Battery 100, terminal 101, wire 102, terminal 47, controller series winding 46, terminal 48, blade 54, contact 55, contact 56, terminal 57, wire 103, wire 104, series field winding 27, generator terminal 105, brush 30, armature windings 23, brush 29, generator terminal 106, wire 107, terminal 97, ampere hour terminal 91, terminal 92, battery terminal 108 to battery 100.

The dynamo shunt field circuit begins at terminal 105, wire 109, wire 110, latch 73, armature 83, contacts 85, 86, wire 111, shunt field windings 26 to generator terminal 106. Therefore it is apparent that the dynamo operates as a compound motor for engine starting.

The ignition circuit is as follows:

Battery 100, terminal 101, wire 102, terminal 47, series winding 46, terminal 48, blade 54, contact 58, blade 59, terminal 60, wire 112, wire 113, contacts 34, 33, ignition coil primary 114, ignition resistance 115, terminal 116, wire 117, terminal 97, ampere hour meter 90, battery terminal 108 to battery 100.

The controller winding 49 will be connected across the line in the following manner:

From terminal 51 which is on the positive side, the winding 49 is connected through terminal 50 and wire 117 to terminal 97 on the negative side. While current is being delivered from the battery to the dynamo the windings 49 and 46 act differentially so that the core 42 will not be energized enough to hold the armature 45 in attracted position. When the engine becomes self-operative, the direction of current flow is reversed through the winding 46, the dynamo sending current to the battery. Then the windings 46 and 49 act cumulatively to hold the armature 45 in attracted position. Then as the engine becomes self-operative and has picked up in speed the lever 61 is released permitting the contacts 65 and 66 to return to engagement while the armature 45 holds blade 54 and contact 55 in engagement with contacts 58 and 56 respectively. The closing of contacts 65 and 66 causes the series windings 27 of the dynamo to be short-circuited so that the dynamo acts as a shunt wound generator during the battery charging operation. When the lever 61 is released, the links 70, 71, and 72 will buckle slightly to permit the lever 61 to return to the position shown while permitting the armature 83 to remain in notch 76.

The battery charging circuit is as follows:

Generator terminal 105, wire 109, controller terminals 67, contacts 66, 65, blade 64, terminal 51, wire 103, terminal 57, contacts 56, 55, blade 54, terminal 48, series winding 46, terminal 47, wire 102, battery terminal 101, battery 100, battery terminal 108, ampere hour meter 90, terminal 97, wire 107, generator terminal 106.

During the charging of the battery the hand 93 of the ampere hour meter 90 will move in a clockwise direction until it strikes the contact 95 moving it into engagement with the contact 94, whereupon the winding 81 will be connected across the line in the following manner:

From the positive side of the line through line 110, latch 73, contacts 78, 79, winding 81, terminal 82, wire 120, terminal 96, contacts 94 and 95 to terminal 97 on the negative side. The winding 81 being energized the armature 83 will be attracted and will move out of the notch 76 thereby permitting the latch 73 to be restored by spring 73$^a$ to the position shown in Fig. 1 with the armature 83 projecting into the notch 77. This operation causes the shunt field circuit to be broken at the contacts 85 and 86 and also causes the circuit to the winding 81 to be broken by the separation of contacts 78 and 79 so that after the winding 81 has functioned to render the dynamo inoperative as a generator there will be no further discharge of the battery through this winding.

Since the generator is now inoperative the battery 100 will tend to discharge through the generator armature windings but a reversal of current in the winding 46 will cause the core 42 to become demagnetized to such an extent that the armature 45 will drop down by gravity to the position shown in Fig. 1, whereupon the charging circuit will be broken by the separation of contacts 55 and 56 and the ignition circuit will be broken by the separation of blade 54 from contact 58. There being no ignition, the engine will stop automatically upon the closing of contacts 95, 94 by means of the ampere hour meter.

Should it be desirable to operate the engine merely as a power plant without generating any current, ignition may be provided through the following circuit:

Battery 100, terminal 101, wire 102, wire 121, switch 122, wire 113 to the ignition timer contacts, the remainder of the ignition circuit being as hereinbefore stated.

The flywheel pulley 38 is preferably loose on the shaft 39 as stated before in order that the machinery driven by the engine may be stopped without stopping the engine there being a magnetic clutch winding 37 between the pulley and the flywheel 36. Whenever it is desired to energize the clutch winding 37, the switch 123 is closed causing the winding 37 to be connected across the line by means of wires 124, 125, switch 123, and wire 126. A magnetic clutch is particularly desirable where an internal-combustion engine is the motive power since machinery may be stopped and started without starting and stopping the engine.

Even though the battery may be fully charged, when it is desired to start the engine the starting operation may be carried out in the manner described by the pulling up of the lever 61. But as contacts 94 and 95 are now closed of course the contacts 85 and 86 cannot be closed since the magnet 81 will be energized and will be pulling down the armature 83 to keep the contacts 85 and 86 open. But the dynamo may still function as a straight series motor to crank the engine. After the engine becomes self-operative of course the armature 45 will not remain in attracted position since the battery is full but ignition will continue to be provided in case the switch 122 remains closed. Now if it is desired to have the engine continue operation even after the battery has reached a certain charge it is not necessary to cause the engine to stop and then start it up again but the switch 122 is closed while the battery charging operation is going on so that in case the battery reaches the predetermined charge before it is desired to stop, the engine ignition will continue to be supplied through the switch 122 although the ignition switch contact members 54 and 58 be separated after the battery has reached the said charge. This feature of the invention is advantageous since the driving of a piece of machinery by the engine is not interfered with by the operation of the ampere hour meter. Another important advantage is that since the battery has reached the certain charge the dynamo is rendered inoperative as a generator by the opening of the field circuit so that there is no magnetic drag upon the armature, placing an unnecessary load upon the engine.

During the operation of the engine the battery charging circuit may become automatically disconnected and the dynamo rendered inoperative as a generator, and the dynamo load would suddenly be thrown off the engine. In order to govern the engine under these conditions a suitable flyball governor driven through gear 151, 152 and shaft 153 is provided. This governor includes weights 154, 154 pivoted at 155, said weights includes fingers 156, 156 adapted to bear upon a plunger 157 normally pressed outwardly from the engine by spring 158. The plunger 157 is engaged by the arm 159 of a bell crank lever 160 pivoted at 161. Lever 160 is connected by link 162 to the engine throttle 163. The governor is enclosed within a suitable housing 164.

It is pointed out that the present invention contemplates a power plant including an engine and a plurality of load. One of these loads is a mechanical load including the pulley which may be belted to a machine, to be driven by the engine. The engine itself and parts permanently attached to the crank shaft thereof are to be distinguished from the mechanical load. The other load is an electrical one and includes the dynamo when functioning as a generator, the electrical circuits and the storage battery. This electrical load is one which becomes reduced as the battery becomes charged. As the battery E. M. F. increases with increased charge, the charging current decreases, hence the electrical load decreases. When the battery has reached a predetermined charge the electrical load will be discontinued entirely by disconnecting the battery from the dynamo, and by rendering the dynamo inoperative, that is, incapable of generating. It is therefore apparent that there has been provided means for discontinuing one of the loads entirely in case that load is reduced.

The engine will stop or keep on running after the electrical load is discontinued depending on whether the switch 122 is open or closed. Hence switch 122 is a device for selectively determining whether or not the engine will continue to operate when one of the loads is automatically discontinued.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. A power plant comprising in combination, an engine, a dynamo driven by said engine, a storage battery adapted to be charged by the dynamo, means for rendering the dynamo field inoperative automatically in response to the state of battery charge, and means under the control of the operator for causing the engine to stop automatically in response to the state of battery charge or for permitting the engine to continue running after the battery charging has been discontinued.

2. A power plant comprising in combination, an internal combustion engine, an ignition circuit for the engine, a dynamo driven by said engine, a storage battery adapted to be charged by the dynamo, a controller for the connection between the dynamo and battery and for the ignition circuit, an auxiliary ignition circuit for the engine, means for operating said controller for interrupting the ignition circuit controlled thereby and for interrupting the circuit between the battery and dynamo in response to the state of battery charge, and means under the control of the operator for causing the engine to stop automatically in response to the state of battery charge by operation of said controller or for permitting the engine to continue running with ignition supplied through said auxiliary ignition circuit after the battery has been automatically disconnected from the dynamo.

3. A power plant comprising in combination, an internal-combustion engine, a dynamo driven by the engine, a battery charged by the dynamo, an ignition device for the engine, a controller having a magnet coil responsive to the generation of current by the dynamo for maintaining circuit connections between the dynamo, battery and ignition device, means responsive to the state of battery charge for rendering the dynamo inoperative to generate, and a switch for establishing a different circuit between the battery and ignition device whereby the engine may continue to operate although other circuits may be interrupted.

4. A power plant comprising in combination, an internal combustion engine, a dynamo driven by the engine, a battery charged by the dynamo, an ignition device for the engine, a controller having a magnet coil responsive to the generation of current by the dynamo for maintaining circuit connections between the dynamo, battery and ignition device, means responsive to the state of battery charge for rendering inoperative the dynamo field used while generating, and a switch for establishing a different circuit between the battery and ignition device whereby the engine may continue to operate although other circuits may be interrupted.

5. A power plant comprising in combination, an internal combustion engine, a dynamo driven by the engine and having motoring and generating field windings, a battery charged by the dynamo, an ignition device for the engine, manual means for connecting the ignition device and the dynamo with the battery and for rendering the motoring field winding operative whereby the dynamo may operate as a motor to crank the engine, an electromagnet responsive to the generation of current by the dynamo for maintaining the dynamo and ignition device connected with the battery, means responsive to the state of battery charge for rendering the generating field winding inoperative, and a manually operated switch for connecting the battery and ignition device so that the engine may be operated regardless of the ability of the dynamo to generate.

6. A power plant comprising in combination, an internal combustion engine, a dynamo driven by the engine and having motoring and generating field windings, a battery charged by the dynamo, an ignition device for the engine, manual means for connecting the ignition device and the dynamo with the battery and for rendering the motoring field winding operative whereby the dynamo may operate as a motor to crank the engine, an electromagnet responsive to the generation of current by the dynamo for maintaining the dynamo and ignition device connected with the battery, a spring closed switch for completing a field circuit of the dynamo, an armature connected with the switch, an electro-magnet cooperating with the armature for opening said switch.

a spring actuated latch normally engaging said armature to hold said switch open, means connecting the latch with said manual means so that the latter moves the latch to release said armature and switch, the armature cooperating with the latch to maintain it in the position into which the latch is moved by the manual means, a switch controlled by the state of battery charge for causing the magnet to be energized in order to move the switch to open position and to permit the latch to return to normal position, and a manually operated switch for connecting the battery and ignition device so that the engine may be operated regardless of the ability of the dynamo to generate.

7. A power plant comprising in combination, an internal combustion engine, a dynamo driven by the engine, a battery charged by the dynamo, an ignition device for the engine, manual means for connecting the ignition device and the dynamo with the battery, an electro-magnet responsive to the generation of current by the dynamo for maintaining the dynamo and ignition device connected with the battery, a spring closed switch for completing a field circuit of the dynamo, an armature connected with the switch, an electro-magnet cooperating with the armature for opening said switch, a spring actuated latch normally engaging said armature to hold said switch open, means connecting the latch with said manual means so that the latter moves the latch to release said armature and switch, the armature cooperating with the latch to maintain it in the position into which the latch is moved by the manual means, a switch controlled by the state of battery charge for causing the magnet to be energized in order to move the switch to open position and to permit the latch to return to normal position, and a manually operated switch for connecting the battery and ignition device so that the engine may be operated regardless of the ability of the dynamo to generate.

8. A power plant comprising in combination, an internal-combustion engine, a dynamo driven by the engine, a battery charged by the dynamo, an ignition device for the engine, manual means for connecting the ignition device and the dynamo with the battery, an electro-magnet responsive to the generation of current by the dynamo for maintaining the dynamo and ignition device connected with the battery, a spring closed switch for completing a field circuit of the dynamo, an armature connected with the switch, an electromagnet co-operating with the armature for opening said switch, a switch in circuit with said magnet and having a movable contact, a latch controlling said movable contact and spring-actuated normally to open said magnet switch and to engage said armature to hold the field switch open, means connecting the latch with said manual means so that the latter will move the latch to close said magnet switch and to release said armature to permit closing the field switch. the armature cooperating with the latch to maintain it in the position into which the latch is moved by the manual means, a second switch in the magnet circuit and closed in response to the battery attaining a certain high state of charge for causing the magnet to be energized in order to move the field switch to open position and to permit the latch to return to normal position, and a manually operated switch for connecting the battery and ignition device so that the engine may be operated regardless of the ability of the dynamo to generate.

9. A power plant comprising in combination, an engine; a dynamo driven by the engine; a battery charged by the dynamo; and means for controlling a circuit of the dynamo, said means including a switch which when closed renders the dynamo operative to generate, manually controlled means for closing the switch, an electro-magnet for opening the switch, two switches for controlling the circuit of the electro-magnet, one of the magnet switches being closed manually and the other magnet switch being closed in response to a certain state of the battery charge, and means responsive to the energizing of the magnet for causing the manually closed magnet switch to be opened automatically.

In testimony whereof I hereto affix my signature.

JOSEPH C. FEDERLE.